United States Patent [19]

Boskovic

[11] Patent Number: 5,694,661
[45] Date of Patent: Dec. 9, 1997

[54] ADJUSTABLE LEADER PIN BUSHING FOR PLASTIC MOLD

[76] Inventor: Borislav Boskovic, 2102 Bannockburn, Inverness, Ill. 60067

[21] Appl. No.: 761,019

[22] Filed: Dec. 5, 1996

[51] Int. Cl.⁶ ..................................................... F16L 5/00
[52] U.S. Cl. ............................................. 16/2.1; 248/634
[58] Field of Search ..................... 16/2.1, 2.2, 2.5; 248/634, 635

[56] References Cited

U.S. PATENT DOCUMENTS

| | | | |
|---|---|---|---|
| 2,209,274 | 7/1940 | Jaberg | 16/2.1 |
| 2,428,932 | 10/1947 | Fawick | 16/2.1 |
| 2,787,486 | 4/1957 | Thiry | 16/2.1 |
| 3,801,209 | 4/1974 | Matsuoka | 16/2.1 |
| 3,890,458 | 6/1975 | Mooney | 16/2.1 |
| 4,513,954 | 4/1985 | Cantamessa | 16/2.1 |

*Primary Examiner*—Chuck Mah
*Attorney, Agent, or Firm*—Lee, Mann, Smith, McWilliams, Sweeney & Ohlson

[57] ABSTRACT

An adjustable bushing to accommodate a leader pin of a plastic mold. The adjustable bushing comprises a cylindrical body having a liner installed therewithin. The liner is smaller in outer diameter than the inner diameter of the body creating a gap between the liner and the body so that the liner can shift relative to the body when engaging a leader pin. The liner is held in place against an extending internal ledge of the body by a removable cap. Compressible O-rings about the liner maintain the liner in a centered orientation in the body.

10 Claims, 1 Drawing Sheet

ADJUSTABLE LEADER PIN BUSHING FOR PLASTIC MOLD

BACKGROUND OF THE INVENTION

This invention relates to plastic molds, and in particular to an adjustable bushing for one half of a mold to accommodate a leader pin from the other.

A typical plastic mold consists of two basic metal parts—a core half and a cavity half. During the molding operation, the mold is heated or cooled as required, which causes expansion or contraction of the mold portions. Often, a temperature differential between the core and the cavity can exceed 100° F. Thus, a mold which has properly aligned leader pins when the mold is cool, often has misaligned leader pins when the mold is hot. Misalignment can cause galling between the leader pins and the bushings in which the pins are inserted when the mold portions are closed. When damage occurs, either the leader pins or the bushings, or both, must be replaced.

SUMMARY OF THE INVENTION

The invention relates to an adjustable bushing for accommodating leader pins. The adjustable bushing comprises a cylindrical body having a predetermined internal diameter. Means is provided at one end of the body to form an internal ledge. A cylindrical liner is located within the cylindrical body, the liner having a predetermined external diameter less than the predetermined internal diameter of the cylindrical body, forming a gap between the liner and the body. A removable cap is secured to the other end of the body, the cap having an internal projection complementary to the internal ledge at the other end of the body, and the liner is sandwiched between the ledge and the projection to hold it in place.

In accordance with the preferred form of the invention, the liner has a predetermined wall thickness. The internal projection of the cap is generally circular, and has an overhang into the body not greater than the wall thickness. Similarly, the ledge extending from the cylindrical body is generally circular, and also has an overhang into the body not greater than the wall thickness.

The cap is threadedly secured to the cylindrical body. Means is provided for facilitating removal of the cap from the body, that means preferably comprising opposite indentations on the cap.

The liner includes at least one external groove. A compressible ring is located in each groove to center the liner in the body, but since the rings are compressible, the liner can be shifted relative to the body to accommodate a misaligned leader pin.

In the preferred form of the invention, the internal projection of the cap and the internal ledge extending from the body both extend the same distance into the body. The internal ledge is an integral extension of the body.

BRIEF DESCRIPTION OF THE DRAWINGS

The invention is described in greater detail in the following description of an example embodying the best mode of the invention, taken in conjunction with the drawing figures, in which.

DESCRIPTION OF AN EXAMPLE EMBODYING THE BEST MODE OF THE INVENTION

Figure 1:
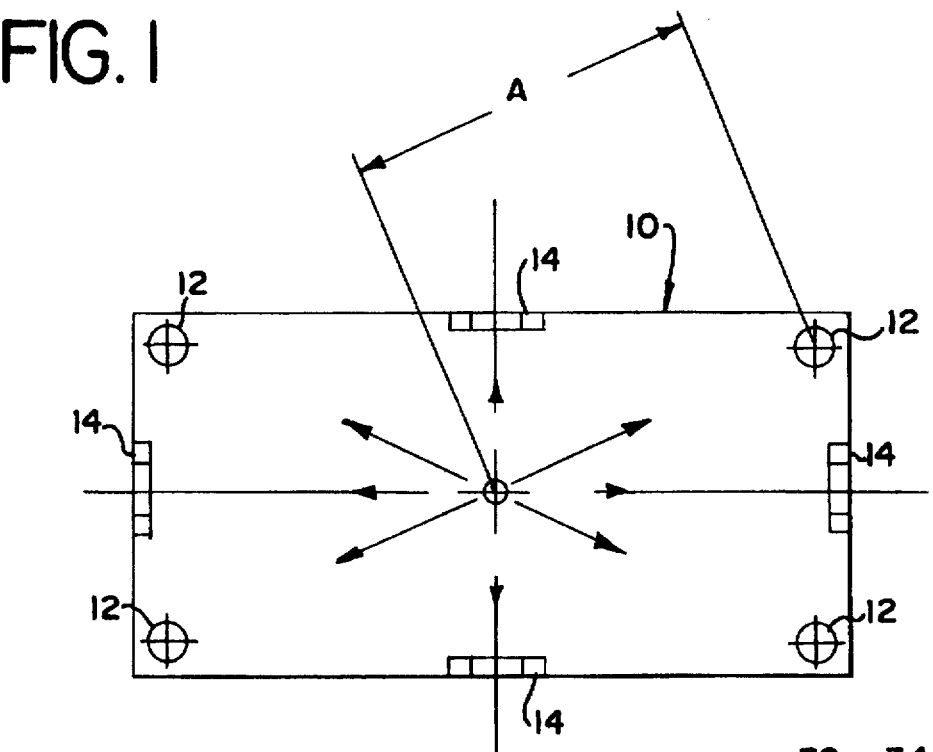
FIG. 1 is a top plan view of a mold half and illustrating apertures where leader pin bushings are installed, and also showing schematically the direction of mold expansion due to heating.

A mold half is shown schematically in FIG. 1 and designated generally at 10. The mold half can be either the core or the cavity, and as is typical, includes a series of apertures 12 at the corners thereof for leader pin bushings. The other half of the mold (not illustrated) conforms to the mold half 10, and would include, among other things, leader pins in alignment with bushings installed in the apertures 12. The mold half 10 also includes a series of guide portions 14 of locks used for joining mold halves, in a conventional fashion.

As illustrated in FIG. 1, heat expansion of the mold half 10 radiates outwardly from the center of the mold half. Thus, the corners of the mold half, where the apertures 12 are located, experience the greatest expansion. For example, the expansion between the center of the mold and one of the apertures 12, designated "A" in FIG. 1, can be significant. The co-efficient of expansion for steel is 0.0000065 per inch per degree Fahrenheit. Thus, for a 100° differential, the expansion for a ten inch dimension "A" is 0.0065 inches, for a 20 inch "A" is 0.0130 inches and for a 30 inch "A" is 0.0195 inches. These can be significant differentials in a plastic mold, where precise dimensions are demanded.

Figure 2:
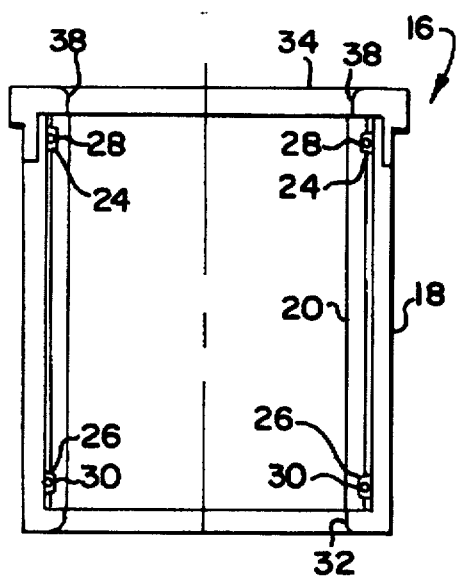
FIG. 2 is an enlarged cross-sectional illustration of an adjustable bushing according to the invention which can be installed in one of the bushing apertures of FIG. 1.
Figure 3:
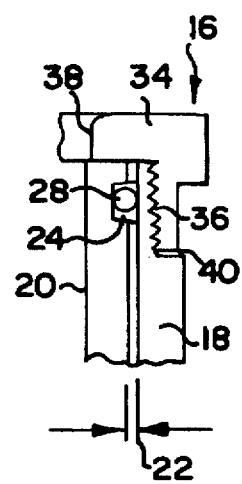
FIG. 3 is a further enlarged partial cross section of one corner of the adjustable bushing illustrated in FIG. 2, showing additional detail.
Figure 4:
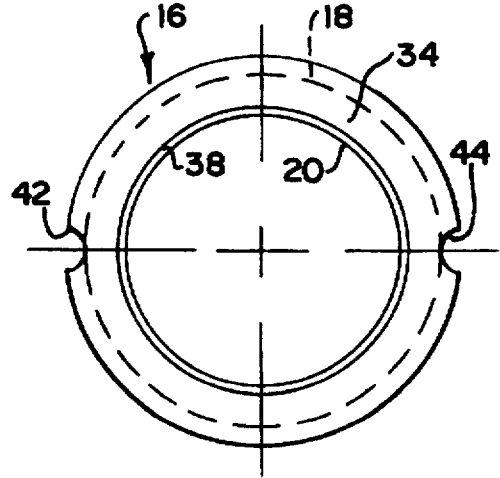
FIG. 4 is a top plan view of the adjustable bushing shown in FIG. 2.

The adjustable leader pin bushing according to the invention, for accommodating such expansion, is shown in FIGS. 2 through 4, and is designated generally at 16. The bushing 16 is composed of a generally cylindrical body 18 having a cylindrical liner 20 installed therewithin. As illustrated in FIGS. 2 and 3, the cylindrical liner 20 has an external diameter less than the internal diameter of the cylindrical body 18 so that a gap 22, depicted schematically in FIG. 3, is formed between the liner 20 and the body 18. The gap 22 is formed circumferentially around the liner 20.

To orient the liner 20 centrally within the body 18, the liner 20 includes a pair of external circumferential grooves 24 and 26. A compressible ring 28 and 30, such as an O-ring, is located in a respective groove 24 and 26 to maintain the liner normally at a central orientation within the body 18 with the gap 22 formed thereabout.

The liner 20 preferably has a generally constant wall thickness, as depicted in the cross section in the drawing figures. The body 18 includes an annular internal ledge 32 extending into the interior of the body 18 and forming a shelf upon which the liner 20 bears. The ledge 32 extends into the interior of the body 18 a distance no greater than the wall thickness of the liner 20.

Similarly, the opposite end of the body 18 is topped by an annular cap 34. The cap 34 is applied to the body 18 by means of a threaded connection 36 (FIG. 3). The cap 34 includes an annular internal projection 38 extending into the interior of the body 18, and as best shown in FIG. 3, the projection is generally circular and extends into the body 18 a distance not greater than the wall thickness of the liner 20. It is preferred that the ledge 32 and the projection 38 be substantially identical and complementary to one another, with the ledge 32 being an integral extension of the material of the body 18 and the liner 20 firmly sandwiched between the ledge 32 and the projection 38.

As shown in FIG. 3, a slight gap 40 occurs between the cap 34 and the body 18. This is for adjustment purposes, so that the cap 34 can be tightened as much as desired on the liner 20 to maintain the liner 20 in place. For facilitating tightening and removal of the cap 34, the cap includes opposite indentations 42 and 44, as illustrated in FIG. 4, which can be engaged by an appropriate tool for rotating the cap 34 relative to the body 18.

The adjustable leader pin bushing 16 is assembled by first installing the compressible rings 28 and 30 in their respective grooves 24 and 26 in the liner 20. The liner 20 is then installed in the cylindrical body 18, bottomed against the internal ledge 32. The cap 34 is then applied, with the liner 20 sandwiched between the ledge 32 and the projection 38, and the cap 34 is tightened as much as desired. The bushing 16 is then installed in one of the apertures 12 of the mold half 10. Similar bushings are installed in the remaining three apertures 12.

The leader pins of the typical plastic mold are sized to fit snugly within the internal dimension of the liner 20. If perfect alignment occurs, the liner 20 remains centered within the body 18, as illustrated in the drawing figures. However, if there is misalignment between the pin and the bushing 16, as the pin enters the liner 20, the liner 20 is shifted in the direction of misalignment by compressing the rings 28 and 30 between the liner 20 and the body 18. The liner 20 can therefore shift as much as the width of the cap 22 to accommodate misalignment between the leader pin and the bushing 16.

It is preferred that the compressible rings 28 and 30 be made of any compressible material having a capacity to accommodate temperatures experienced by a typical plastic mold. The remaining portions of the bushing 16 are preferably metal, and since the cap 34 is removable, a series of interchangeable liners 20 can be provided. The liners 20 can be made of different materials, such as hardened steel, bronze alloys, or Teflon coated steel.

Various changes can be made to the invention without departing from the spirit thereof or scope of the following claims.

What is claimed is:

1. An adjustable bushing, comprising a. a cylindrical body having a predetermined internal diameter.

b. means at one end of said body forming an internal ledge, c. a cylindrical liner within said cylindrical body, said liner having a predetermined external diameter less than said predetermined internal diameter, forming a gap between said liner and said body, and d. a removal cap secured to the other end of said body, said cap having an internal projection complementary to said ledge, said liner being sandwiched between said ledge and said projection.

2. An adjustable bushing according to claim 1 in which said liner has a predetermined wall thickness.

3. An adjustable bushing according to claim 2 in which said projection is generally circular, having an overhang into said body not greater than said wall thickness.

4. An adjustable bushing according to claim 2 in which said ledge is generally circular, having an overhang into said body not greater than said wall thickness.

5. An adjustable bushing according to claim 1 in which said cap is threadedly secured to said other end.

6. An adjustable bushing according to claim 5 including means facilitating removal of said cap from said body.

7. An adjustable bushing according to claim 6 in which said facilitating means comprises opposite indentations on said cap.

8. An adjustable bushing according to claim 1 in which said liner includes at least one external groove.

9. An adjustable bushing according to claim 8 including a compressible ring located in said groove.

10. An adjustable bushing according to claim 1 in which said internal ledge is an integral extension of said body.

* * * * *